(12) United States Patent
Zolynski et al.

(10) Patent No.: US 12,510,185 B2
(45) Date of Patent: Dec. 30, 2025

(54) DEVICE FOR MONITORING OPERATION OF A SOLENOID VALVE AND A METHOD FOR MONITORING OPERATION OF A SOLENOID VALVE

(71) Applicant: DTP SPOLKA Z OGRANICZONA ODPOWIEDZIALNOSCIA, Zielona Gora (PL)

(72) Inventors: Jaroslaw Zolynski, Zielona Gora (PL); Marcin Chciuk, Nowa Sol (PL); Mariusz Zyciak, Zielona Gora (PL)

(73) Assignee: DTP SPOLKA Z OGRANICZONA ODPOWIEDZIALNOSCIA, Zielona Gora (PL)

( * ) Notice: Subject to any disclaimer, the term of this patent is extended or adjusted under 35 U.S.C. 154(b) by 155 days.

(21) Appl. No.: 18/577,323

(22) PCT Filed: Jul. 8, 2022

(86) PCT No.: PCT/EP2022/069069
§ 371 (c)(1),
(2) Date: Jan. 8, 2024

(87) PCT Pub. No.: WO2023/281057
PCT Pub. Date: Jan. 12, 2023

(65) Prior Publication Data
US 2024/0369156 A1    Nov. 7, 2024

(30) Foreign Application Priority Data
Jul. 8, 2021    (PL) .......................................... 438382

(51) Int. Cl.
*F16K 37/00*    (2006.01)
*H01F 7/18*    (2006.01)

(52) U.S. Cl.
CPC ....... *F16K 37/0083* (2013.01); *H01F 7/1844* (2013.01)

(58) Field of Classification Search
CPC ........... H01F 7/1844; H01F 2007/1861; F16K 37/0083
(Continued)

(56) References Cited

U.S. PATENT DOCUMENTS 7,746,620 B2 * 6/2010 Bedingfield .......... H01F 7/1844
361/160

FOREIGN PATENT DOCUMENTS

WO    WO-2017027792 A1 *    2/2017    ........... H01F 7/1844
WO    WO-2019043572 A1 *    3/2019    ......... F16K 31/0627

OTHER PUBLICATIONS

Weiler Alexander et al: "Smart Solenoid Driver with Predictive Maintenance Reference Design", TI Designs, Jan. 1, 2017, pp. 1-28, XP093005336.

* cited by examiner

*Primary Examiner* — Kevin J Comber
(74) *Attorney, Agent, or Firm* — Rivka Friedman (57) ABSTRACT

A device for monitoring the operation of a solenoid valve. This device includes a circuit for powering the coil of a solenoid valve, with terminals designed for connection to the coil, a power supply switching transistor, and a measurement resistor. The device also includes a microprocessor-based measurement system that includes an analogue-to-digital converter with a consumed current measurement channel connected to the measurement resistor and a consumed current amplified measurement channel connected to the consumed current measurement channel via an adjustable amplifier. The system is designed to deactivate the power supply switching transistor when a voltage exceeding a threshold value is detected on the consumed current (Continued)

measurement channel, and control the gain of the adjustable amplifier so that the signal at the input of the consumed current amplified measurement channel is within the measurement range of this channel.

9 Claims, 5 Drawing Sheets

(58) Field of Classification Search
USPC .......................................................... 361/160
See application file for complete search history.

DEVICE FOR MONITORING OPERATION OF A SOLENOID VALVE AND A METHOD FOR MONITORING OPERATION OF A SOLENOID VALVE

TECHNICAL FIELD

The present invention relates to a device for monitoring operation of a solenoid valve and a method for monitoring operation of a solenoid valve. In particular, the present invention relates to detecting malfunctions and damages of solenoid valves, such as coil damage (burnout), blockage of a mechanical component of the solenoid valve, as well as detecting changes in parameters of the solenoid valve that may indicate its wear and tear.

BACKGROUND

Solenoid valves are often used as control devices in industrial pneumatic systems, wherein control of direction of a flow of air enabling the solenoid to open and close is achieved by changing a position of a slider (connected to the solenoid linor or without the linor) by means of an electromagnetic field generated in the solenoid coil. Malfunction of even a single solenoid valve may result in a malfunction of the entire system, If the system contains many solenoid valves, this may result in a time-consuming and labour-intensive search for the location of the fault. Therefore, there have been designed devices for monitoring operation of solenoid valves to facilitate identification of malfunctioning solenoid valves.

One of known methods of monitoring a correct operation of a solenoid valve is to measure changes in inductance of the coil of the solenoid valve. Such solution is described in a European patent EP0499419, wherein a simple electronic analogue circuit is used that compares voltage values at the coil current measurement resistor during the momentary current drop at the moment of the correct operation of the solenoid valve. A comparator signal is used to power a light diode, an acoustic signal or a control unit, so that a potential problem can be quickly identified. However, the solution of EP0499419 does not allow assessment of changes of operation of the solenoid valve, such as a depth of the slider or a rate at which the slider moves. Furthermore, such device requires calibration (i.e. adjustment of its electronic components) in order to match a sensitivity of the device to characteristics of the monitored solenoid valve. Moreover, the solution of EP0499419 does not protect against short circuits in the coil. Furthermore, the system of EP0499419 indicates correct switching of the solenoid valve when it detects a drop in the current flowing through the coil. However, this drop can be caused not only by the switching of the solenoid valve, but also by a momentary drop in the supply voltage, a burning of the coil shortly after switching, or some disturbance. Therefore, the system of EP0499419 is susceptible to various types of instability.

There are also known some digital solutions that utilize a microprocessor chip, for example a TIDA-01250 circuit by Texas Instruments. A reference solution for use of TIDA-01250 in a system for monitoring a solenoid valve coil, as described at www.ti.com/lit/pdf/tiduco6, may fulfil many industrial needs, but is not universal. A single device based on this reference solution cannot be used for coils of different types. Therefore, if one were to use the reference solution for coils of different types, it would be necessary to develop a series of devices adapted to specific operating ranges of various solenoid valves.

SUMMARY OF THE INVENTION

There is a need to provide a method and a device for monitoring operation of solenoid valves that would allow monitoring correct operation of the solenoid valve on an ongoing basis and indicate abnormalities in its operation without interfering with the structure of the solenoid valve. The solution shall be a universal one, intended to monitor a wide variety of solenoid valves, without the need to adapt parameters of the monitoring device to different types of solenoid valve. Preferably, the device should be compact enough to be inserted into a plug of the solenoid valve power cable.

In one aspect, the invention relates to a device for monitoring operation of a solenoid valve, the device comprising: a circuit for supplying power to a coil of a solenoid valve, comprising terminals connected in series with a power source, the terminals configured to be connected to the coil, a power supply switching transistor and a measurement resistor; and a microprocessor-based measurement system configured to monitor supply current consumed by the coil while the coil is switched on, by measuring voltage at the measurement resistor, and to control the power supply switching transistor. The microprocessor-based measurement system comprises an analogue-to-digital converter comprising a consumed current measurement channel connected to the measurement resistor and a consumed current amplified measurement channel connected to the consumed current measurement channel via an adjustable amplifier. The microprocessor-based measurement system is configured to: switch off the power supply switching transistor when a voltage having a value higher than a threshold value is detected on the consumed current measurement channel; and control the gain of the adjustable amplifier so that the signal at the input of the consumed current amplified measurement channel is lower than the measurement range of this channel.

The analogue-to-digital converter may further comprise a supply voltage measurement channel connected to a resistive voltage divider connected between the supply voltage and the ground, and the microprocessor-based measurement system is configured to monitor the range of the supply voltage and the voltage fluctuation when the power supply is being switched on.

The consumed current measurement channel can be connected to the measurement resistor via a low-pass filter.

The microprocessor-based measurement system may further comprise an input/output interface configured to receive a parameter determining the gain value of the adjustable amplifier.

The microprocessor-based measurement system can be further configured to control the gain of the adjustable amplifier so that the signal at the input of the consumed current amplified measurement channel is higher than the threshold minimum value.

The microprocessor-based measurement system can be further configured to control the gain of the adjustable amplifier so that the signal at the input of the consumed current amplified measurement channel is lower than the threshold maximum value.

The microprocessor-based measurement system can be further configured to control the gain of the adjustable amplifier so that the signal at the input of the consumed current amplified measurement channel after stabilisation of the coil current is close to the threshold maximum value.

The device may have its components arranged on a PCB enclosed by a plug configured to connect a power supply to the solenoid valve.

In another aspect, the invention relates to a method for monitoring operation of a solenoid valve, comprising the steps of: connecting a device as described herein to a coil of the solenoid valve; switching on power supply to the power supply switching transistor; awaiting for a signal at the input of the consumed current amplified measurement channel to exceed the minimum value threshold; examining the slope ($\alpha$) of the characteristics of the consumed current amplified measurement channel and storing the value of the signal of the consumed current amplified measurement channel when the slope ($\alpha$) reaches the horizontal, and determining, based on the stored value, the values of the minimum slope ($\alpha_{MIN}$), the limit value of the increment ($\Delta I_L$) and the stabilisation value; continuing examination of the slope ($\alpha$) when the slope ($\alpha$) falls to a value below the minimum slope, until the direction of the slope ($\alpha$) changes from descending to ascending and from this point onwards, checking the signal value increment of the consumed current amplified measurement channel and when it exceeds the increment limit value, awaiting for the current value to stabilise such that the difference between the maximum and minimum values during the specified stabilisation time is smaller than the stabilisation value; reporting that the solenoid valve is switched on correctly if the current value stabilises within the specified final stabilisation time and the current stabilisation does not occur later than the permissible total switch-on time since exceeding the minimum value threshold; and reporting that the solenoid valve failed if the current value does not stabilise before the specified switch-on time since exceeds the minimum value threshold.

The method and device according to the invention allow monitoring operation of solenoid valves, by tracking the values of current of the solenoid valve coil based on monitoring changes in coil inductance over time. By using digital solutions and taking the time parameter into account, the solution according to the invention provides broader diagnostic capabilities than the prior art solutions. In particular, it allows detection of abnormal switching characteristics of the solenoid valve, which can be an early indication of a need to replace the solenoid valve, even before the solenoid valve actually fails. A monitoring device according to the present invention can indicate correct switching of the solenoid valve (or lack of correct switching). It also allows, when the coil is short circuited, protecting the power supply source and elements of the path for measuring and controlling the switching of the coil, by cutting off the supply of power to the faulty coil. Moreover, the monitoring device allows to indicate that the supply voltage provided to the coil is too low or too high (via a LED or an IO-Link interface). Furthermore, the solution according to the present invention not only indicates the correct switching of the solenoid valve, but also measures electrical and timing parameters that can be read by the host system and used to assess changes in the operation or wear and tear of the solenoid valve or to schedule maintenance of the solenoid valve.

The device according to the invention fits into standard solenoid valve power plugs, therefore it can be used to monitor solenoid valves of various manufacturers without having to adjust the device parameters to the specificity of a given solenoid valve. At the same time, due to the use of an adjustable gain subsystem in a path for measuring a current-time waveform, it was possible to achieve versatility in terms of cooperation with a wide current spectrum of solenoid valves without having to adapt the structure of the device to different coil operating currents.

The solution according to the invention allows to use the same physical shunt in a form of a measuring resistor in the coil current measurement path for a very diverse range of operating currents of solenoid valve coils available on the market, having values in the order of tens of mA to a few A, and allows use of a shunt (resistor) with a low resistance, which as a result reduces the amount of heat released at the shunt.

The reference solution for the TIDA-01250 circuit described in the background section, without the modification to the coil current measurement path as provided by the present invention, would require splitting of the physical layer into dedicated electronic packages for specific operating ranges of solenoid valves, because (due to the measurement range and resolution of the ADC converter) it is not possible to assess correctness of coil current waveform for a specific shunt resistance for such diverse operating current ranges of solenoid valve coils. In the absence of an adjustable amplifier, the shunt resistance and the amplifier gain are optimally selected for a group of coils with a specific rated power range, and the use of such a device for a coil significantly different in its rated power from the adopted assumptions causes that the range of the voltage signal reflecting the coil current either exceeds the measuring range of the ADC converter, or changes only in a small measuring range of the ADC converter, which in both cases will result in the inability to correctly assess the coil current shape by the processor algorithm. This, in turn, excludes the versatility of the solution in a commercial sense-one electronic module in the plug for all solenoid valves.

These and other features, aspects and advantages of the invention will become better understood with reference to the following drawings, descriptions and claims.

BRIEF DESCRIPTION OF DRAWINGS

Various embodiments are herein described, by way of example only, with reference to the accompanying drawings, wherein.

DETAILED DESCRIPTION

Figure 1:
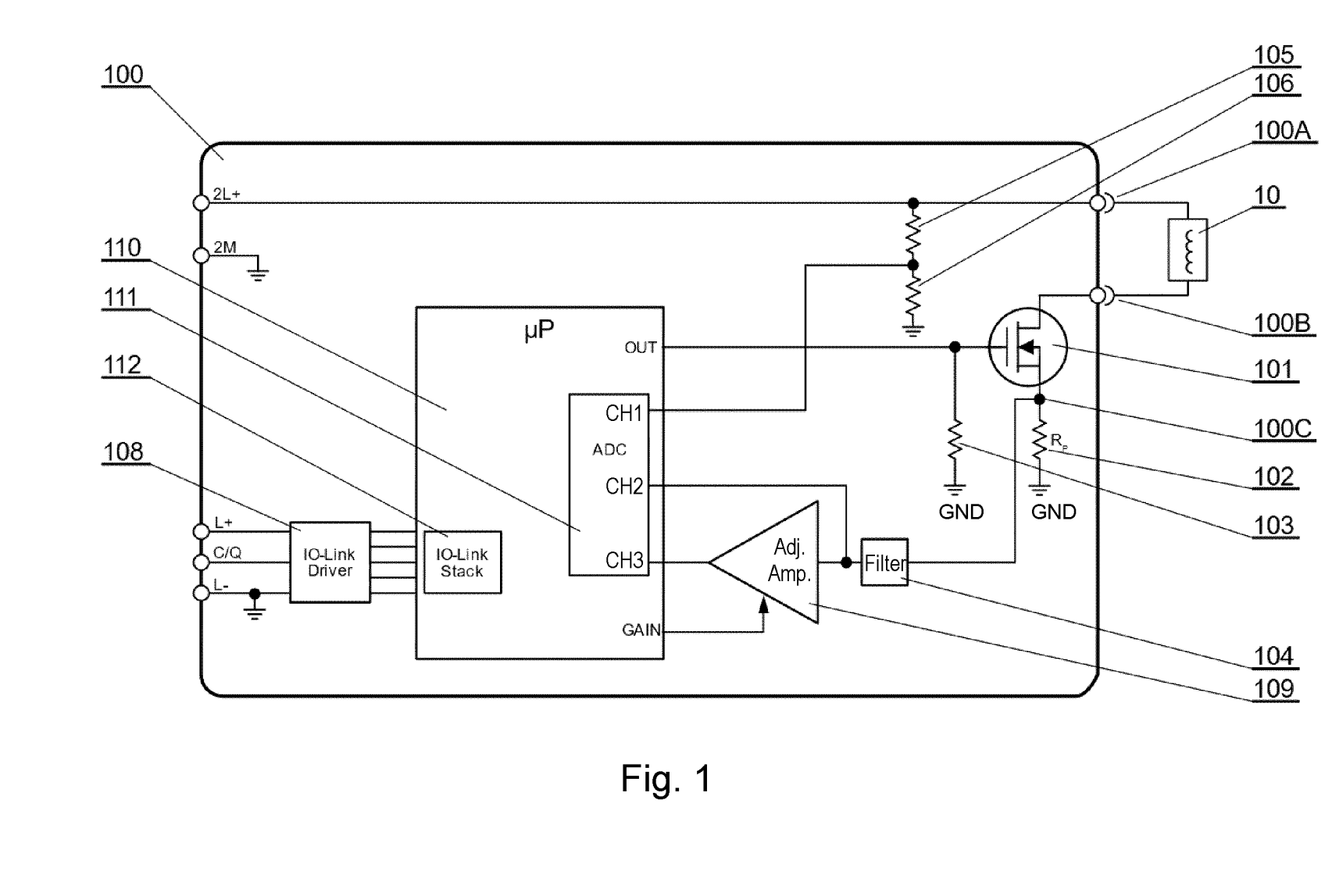
FIG. 1 shows a functional diagram of a solenoid valve monitoring device.

FIG. 1 shows an example embodiment of a functional diagram of device according to the invention. Preferably, the components of the device are installed within a solenoid valve power plug.

The device comprises a connection interface to connect it to a coil 10 of a solenoid valve. The connection interface comprises a first terminal 100A connected to a supply voltage 2L+ and configured to be connected to a first terminal of the coil 10 of the solenoid valve, and a second terminal 100B configured to be connected to a second terminal of the coil 10 of the solenoid valve.

The device comprises a power supply switching transistor 101 connected between the second terminal 100B and a measurement resistor 102 connected to a ground (GND) potential of the system. The power supply switching transistor 101 is preferably a MOSFET type transistor. The power supply switching transistor 101 provides current to the coil in order to switch the solenoid valve on and off.

The voltage at the measurement resistor 102 at point 100C reflects the power supply current consumed by the coil when it is switched on. This voltage is monitored by a microprocessor-based measurement system 110 that also controls the transistor 101 that switches on the coil power supply via a power supply control output OUT.

A protection resistor 103 protects the power supply switching transistor 101 from accidentally switching on during an initial phase of operation, after power has been applied to the system, when the microprocessor-based measurement system 110 is just starting up and the power supply control output OUT is not yet controlled by the microprocessor-based measurement system 110 and set as unpolarised. During this period, the protection resistor 103 connects the gate of the power supply switching transistor 101 to the GND potential, which prevents the power supply switching transistor 101 from switching on. When the microprocessor-based measurement system 110 starts and configures the power supply control output OUT, the resistance of the protection resistor 103 is irrelevant in controlling the power supply switching transistor 101.

The microprocessor-based measurement system 110 comprises an analogue-to-digital converter 111. The converter 111 may have a form of a single multi-channel converter, of an assembly of multiple single-channel converters, or of a combination thereof. The analogue-to-digital converter 111 has three channels: CH1, CH2, CH3. The first channel CH1 is configured to measure the voltage at a voltage divider composed of series-connected resistors 105, 106 and connected between the supply voltage 2L+ of the coil and the GND potential. The signal from the analogue-to-digital converter 111 from the first channel CH1 (also referred to as the supply voltage measurement channel) is used to assess the quality of the supply voltage, i.e. whether the supply voltage is within a permissible range, whether there are fluctuations when the solenoid valve power supply is being switched on (that could affect the switching current characteristics and incorrect detection of switching on the solenoid valve). The second channel CH2 (also referred to as the consumed current measurement channel) is used to measure the voltage at the measurement resistor 102 after filtering through a low-pass filter 104. The signal from the low-pass filter 104 is also supplied to an adjustable amplifier 109, the output of which is connected to the third channel CH3 of the analogue-to-digital converter 111.

The voltage at the measurement resistor 102 at point 100C is proportional to the instantaneous current of the coil. This signal may, in addition to the voltage proportional to the coil current, also contain noise (interference) from the power supply path or from the environment wherein the system operates. The low-pass filter 104 eliminates these noises by passing only the lower-frequency useful signal that is supplied to the second channel CH2 of the analogue-to-digital converter 111 and to the input of the adjustable amplifier 109. For example, the low-pass filter may have a cut-off frequency of 2000 Hz. The signal from the adjustable amplifier 109 is supplied to the third channel CH3 of the analogue-to-digital converter 111. The measurement resistor 102 has a fixed known value, hence the voltage on the second channel CH2 of the analogue-to-digital converter 111 is proportional to the coil current, with a constant ratio. The signal supplied to the second channel CH2 is used to detect a short circuit in the coil 10 of the solenoid valve and to calculate a new gain for the adjustable amplifier 109. An occurrence (on the second channel CH2) of a voltage greater than the adopted threshold value considered as the short-circuit threshold, causes the power supply switching transistor 101 to be switched off immediately, by setting the power supply control output OUT to a low state L. The signal at the input of the third channel CH3 of the analogue-to-digital converter 111 is the signal amplified by the adjustable amplifier 109, supplied from the low-pass filter 104—the same as the signal supplied to the input of the second channel CH2. The adjustable amplifier 109 allows the low-value signal from the low-pass filter 104 to be adapted to the measurement range of the analogue-to-digital converter 111 in order to monitor the current waveform of the coil 10 with a resolution as high as possible. As a result, the device can be connected to coils 10 having various powers, which will cause flow of currents of various values. The gain in the adjustable amplifier 109 may be adjusted linearly or stepwise, depending on the functionality of the adjustable amplifier 109 used, and the adjustment is performed by the gain signal output GAIN of the microprocessor-based measurement system 110, that may be an analogue output (such as a signal from a digital-to-analogue converter), one or more binary outputs allowing stepwise changes in gain, or a digital interface allowing the microprocessor-based measurement system 110 to set the gain in the adjustable amplifier 109. The signal connected to the input of the second channel CH2 of the analogue-to-digital converter 111 is also used (in addition to short-circuit detection) to roughly determine the coil current when, for the actual gain of the adjustable amplifier 109, the signal supplied to the input of the third channel CH3 of the analogue-to-digital converter 111 exceeds its measurement range (this situation may occur, for example, after the coil 10 has been replaced by a coil of a higher power) and the measurements for the second channel CH2 are used to calculate the new gain setting of the adjustable amplifier 109. The optimum gain of the adjustable amplifier 109 should be such that the signal at the input of the third channel CH3 of the analogue-to-digital converter 111 (after the current of the coil 10 has stabilised) is approximately 80% of the measurement range of the third channel CH3 of the analogue-to-digital converter 111. The remaining 20% (i.e. the interval from 80-100%) of the measurement range of the analogue-to-digital converter 111 is the measurement margin for a possible increase in the coil current, resulting from changes in supply voltage or from changes in coil or ambient temperature. The adjustable amplifier 109 has at least as many possible gain levels that, for the intended range of currents of the coils 10, the signal at the input of the third channel CH3 of the analogue-to-digital converter 111, after stabilisation, has a value in the range from an adopted threshold minimum value LIMIT-MIN to a threshold maximum value LIMIT-MAX, for example equal to about 80% of the measurement range of the analogue-to-digital converter 111. The minimum value LIMIT-MIN should be greater than the limit of the possibility of correct switching detection, for example 20% of the measurement range of the analogue-to-digital converter 111. It is preferable to use such adjustable amplifier 109 that will allow the gain to be set so that, irrespective of the coil connected to the system, the signal at the input CH3 of the analogue-to-digital converter 111, after stabilisation of the current of the coil 10, is as close as possible to 80% of the measurement range of the analogue-to-digital converter 111.

The of 20% for the range for LIMIT-MIN and 80% for the range for LIMIT-MAX are to be regarded, as preferable, wherein other embodiments are also possible within the scope of this invention, wherein the LIMIT-MIN value is equal to 10% or 30% and the LIMIT-MAX value is equal to 90% or 70%.

If the signal at the input of the third channel CH3 of the analogue-to-digital converter 111 exceeds 80% after stabilisation, the microprocessor-based measurement system 110 reduces the gain of the adjustable amplifier 109 using the gain signal output GAIN. If the signal at the input CH3 of the analogue-to-digital converter 111 is below the LIMIT-MIN value after stabilisation, the microprocessor-based measurement system 110 increases the gain of the adjustable amplifier 109 using the gain signal output GAIN.

The microprocessor-based measurement system 110 further comprises an input/output interface 112 connected to an input/output controller 108. Via the input/output interface 112, the user can manually configure the parameters (e.g. gain) for the coil of the solenoid valve with which the device will cooperate—this is particularly useful as the device performs a gain adjustment when first powered up with a new coil, which involves switching on the solenoid valve twice in a short time. Such action may not be advisable for the machine in which the solenoid valve operates. Furthermore, the user can set some specific parameters, such as the thresholds, for which the algorithm checks the successive conditions for switching on the solenoid valve.

Figure 2A:
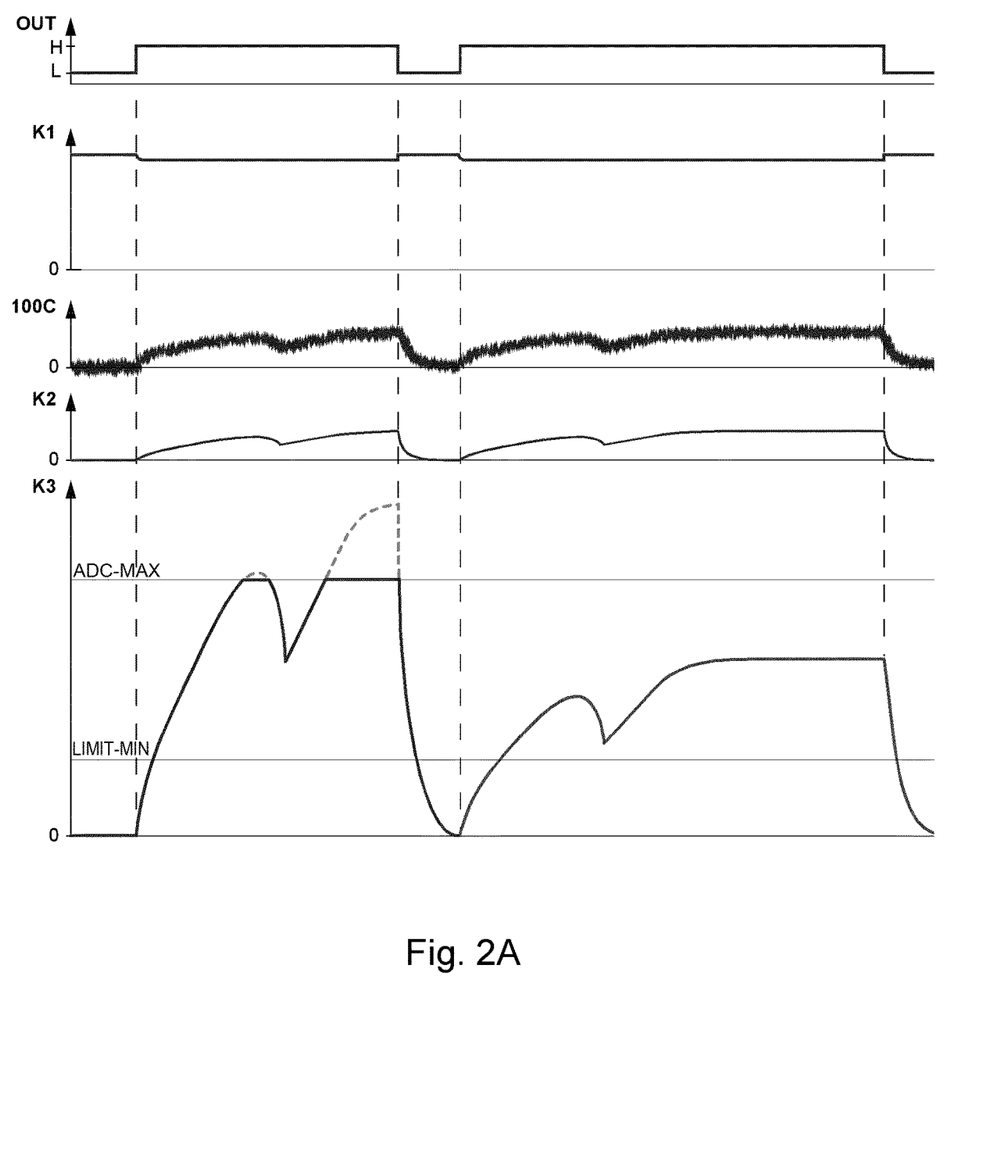
FIG. 2A shows a waveform of signals in the device for a first coil.

FIG. 2A shows an example of signal waveforms in a situation when a coil having a much higher power (higher current) is connected to the system as compared to the coil that was connected during the previous switch-on cycle. The microprocessor-based measurement system 110, having received a command, via the IO-Link interface, to switch on the solenoid valve, sets the power supply control output OUT to a high state H, which causes the power supply switching transistor 101 to switch on and a current to flow through the coil, wherein said current causes a voltage drop at the measurement resistor 102 (voltage at point 100C) proportional to the coil current. The voltage at point 100C, after filtering out interferences in the low-pass filter 104, is supplied to the input of the second channel CH2 of the analogue-to-digital converter 111, and to the input of the adjustable amplifier 109, while the signal from the amplifier is supplied to the input of the third channel CH3 of the analogue-to-digital converter 111. Because of a high gain set in the adjustable amplifier 109, the signal at the input of the third channel CH3 at a certain moment exceeds the measurement range of the analogue-to-digital converter 111 and of the microprocessor-based measurement system 110. If such situation is detected, the device monitors the signal from the input of the second channel CH2 and waits for it to stabilise. When the signal of the second channel CH2 stabilises, the microprocessor-based measurement system 110 measures it and, based on the measurement, calculates and sets the gain of the adjustable amplifier 109, stores the gain setting in non-volatile memory and switches off the coil power supply by setting the power supply control output OUT to a low state L. When the signal at the input of the third channel CH3 falls to about 0 V, the microprocessor-based measurement system 110 switches the power supply to the coil 10 again by setting the power control output OUT to a high state H which switches on the power supply switching transistor 101 and makes the current flow through the coil and through the measurement resistor 102 at which the voltage drop is proportional to the current, this voltage is supplied to the low-pass filter 104 and then to the input of the second channel CH2 of the analogue-to-digital converter 111 and to the input of the adjustable amplifier 109 which now has a new lower gain value set. The amplified signal from the amplifier is supplied to the input of the third channel CH3 of the ADC converter 111.

Figure 2B:
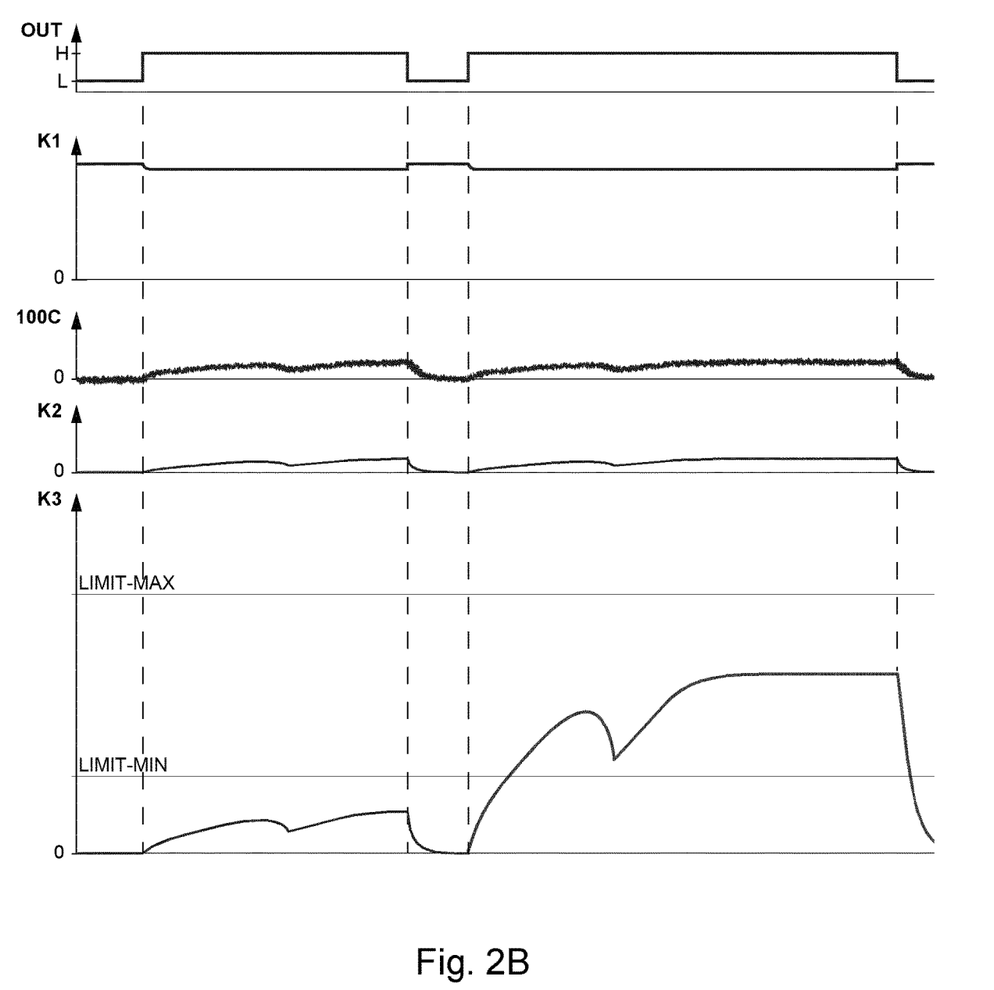
FIG. 2B shows the waveform of signals in the device for a second coil.

FIG. 2B shows a signal waveform in a situation when a coil having a much lower power (lower current) is connected to the system as compared to the coil that was connected during the previous switch-on. The microprocessor-based measurement system 110, having received a command, via the IO-Link interface, to switch on the solenoid valve, sets the power supply control output OUT to a high state H, which causes the power supply switching transistor 101 to switch on and a current to flow through the coil, said current causing a voltage drop at the measurement resistor 102 (voltage at point 100C) proportional to the current. This voltage, after filtering out interferences in the low-pass filter 104, is supplied to the input of the second channel CH2 of the analogue-to-digital converter 111, and to the input of the adjustable amplifier 109, and then the signal from the amplifier is supplied to the input of the third channel CH3 of the analogue-to-digital converter 111. Because the gain at the amplifier 109 is set low, the signal at the input of the third channel CH3, once stabilised, is below the lower limit LIMIT-MIN, which indicates the need to increase the gain on the amplifier 109. The microprocessor-based measurement system 110 measures it and uses the measured value to calculate the new gain value, then sets the new gain of the adjustable amplifier 109, and stores the gain setting in a non-volatile memory and switches off the coil power supply by setting the power control output OUT to a low state L. When the signal at the input of the third channel CH3 falls to about 0 V, the microprocessor-based measurement system 110 switches the power supply to the coil again by setting the power control output OUT to a high state H, which switches on the power supply switching transistor 101 and makes the current flow through the coil and through the measurement resistor 102 at which the voltage drop is proportional to the current. This voltage is supplied to the low-pass filter 104 and then to the input of the second channel CH2 of the analogue-to-digital converter 111 and to the input of the adjustable amplifier 109 which now has a new higher gain value set. The amplified signal from the amplifier is supplied to the input of the third channel CH3 of the analogue-to-digital converter 111.

At the first start (for a brand-new device), the average value of the amplifier gain is set at the output of the gain signal GAIN and the power supply of the coil 10 is switched on. The static current of the coil measured in the second channel CH2 and the third channel CH3 by the analogue-to-digital converter 111 in a steady state after switching on is used to determine an optimal gain for the adjustable amplifier 109, and a value of this gain is stored in the non-volatile memory of the microprocessor-based measurement system 110. The gain, set autonomously in this way, allows the coil 10 current characteristics to be measured optimally over time, with successive starts (switching on the coil). If, during successive switch-ons, the static current of the coil is in the upper part of the measurement range (for example, above the value LIMIT-MAX equal to 80% value of the measurement range) or in the lower part of the measurement range (for example, below the value LIMIT-MIN equal to 20% value of the measurement range) of the analogue-to-digital converter 111 in the third channel CH3, the microcontroller corrects such a state by changing the value of the gain signal GAIN of the adjustable amplifier 109, and the result of the correction, i.e. its new value of the gain signal GAIN, is stored in the non-volatile memory.

Such a mechanism allows coils to be replaced with the same type or a different type (coils with a different current consumption in a steady state, compatible with the mechanics and power plug of the solenoid valve coil) without the need for cumbersome maintenance involving entering new settings into the microcontroller memory for proper operation, although such functionality is provided 'externally' by the interface of the IO-link module integrated in the electronics package. Furthermore, coil replacement does not require physical changes to the electronics package nested in the coil power plug due to the fact that it does not require the need for different shunts in the coil current measurement system.

Figure 3:
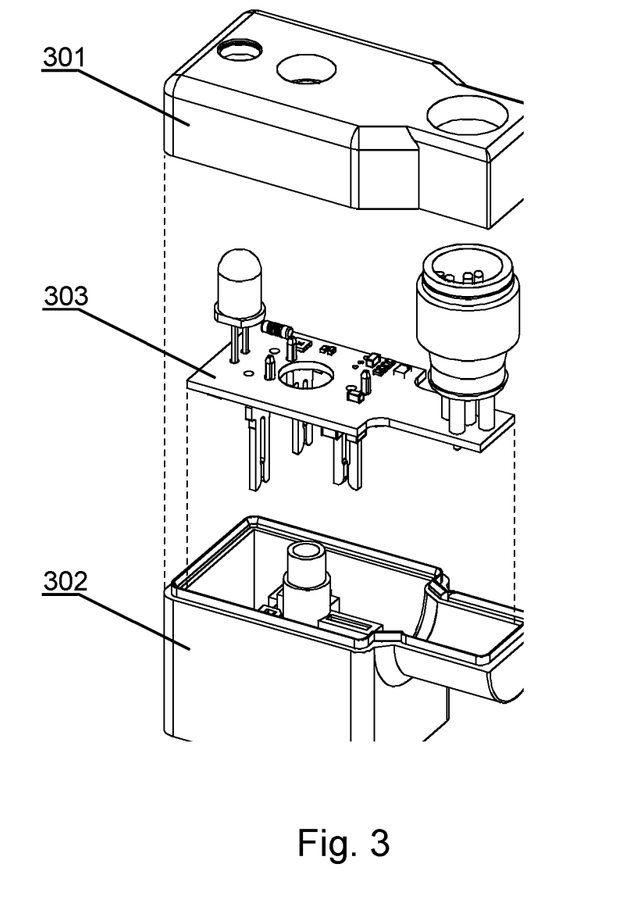
FIG. 3 shows an example of installation of the solenoid valve monitoring device in a power plug for a solenoid valve.

An example of a coil power plug structure is shown in FIG. 3. The components of the system shown in FIG. 1 are mounted on a PCB 303 which is placed in a housing 301, 302.

Figure 4:
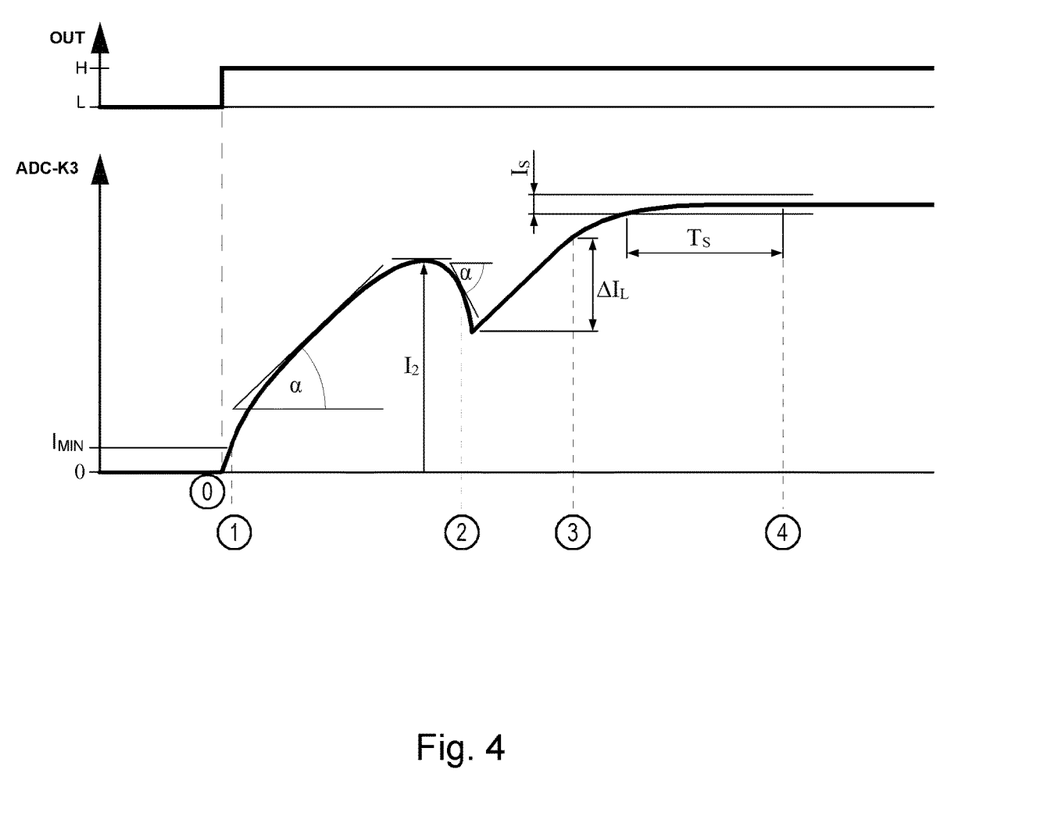
FIG. 4 explains an algorithm for assessment of coil current.

FIG. 4 illustrates operation of an algorithm for assessment of a coil current. After switching on the power supply switching transistor 101 in step 0 (power supply signal OUT set to high state H), the algorithm waits until the signal at the input of the third channel CH3 of the analogue-to-digital converter 111 exceeds the minimum value threshold IMIN, beyond which, in step 1, the slope of the current curve characteristics is examined. When the slope of the curve, represented by an angle α, is horizontal (i.e. the angle α equal to 0 or 180 degrees), the value $I_2$ of the signal at the input of the third channel CH3 is stored. Based on the value $I_2$, the parameters considered in the following part of the algorithm ($\alpha_{MIN}$, $\Delta I_L$, $I_S$) are calculated. Next, the algorithm examines whether the slope α will be smaller than the minimum slope $\alpha_{MIN}$ and, when this is the case, proceeds to step 2. In step 2, the examination of the slope of the characteristics continues until the direction of the characteristics changes from a descending to an ascending one. From this point onwards, the increment of the signal value at the input of the third channel CH3 is checked. When it exceeds the increment limit $\Delta I_L$, the algorithm proceeds to step 3. In step 3, the algorithm waits for the current to stabilise, i.e. it checks whether the difference between the maximum and minimum current values, at the time of stabilisation $T_S$ from the last measurements was lower than the stabilisation value $I_S$. When the current stabilisation is detected, the algorithm proceeds to step 4, which indicates that the solenoid valve is correctly switched on. If the correct switch-on of the solenoid valve is not detected within the specified switch-on time Tz, for example 500 ms, i.e. if the time counted from step 1 to step 4 exceeds the exemplary 500 ms or step 4 is not reached, the system reports a failure of the solenoid valve.

Examples of values of parameters $I_{MIN}$, $\alpha_{MIN}$, $\Delta I_L$, $I_S$, $T_S$ and a method of calculating them based on value $I_2$ are given below. $I_2$ is specified as a percentage of the measurement range of the ADC converter. The calculated parameters (%) refer to the measurement range of the ADC converter:

$$I_{MIN} \approx 3\%$$

$$\alpha_{MIN} \approx -\frac{45°}{\mathrm{atan}\left(\frac{I_2}{2}\right)} \cdot 10 \frac{\%}{msek}$$

$$\Delta I_L \approx \frac{I_2}{2} \cdot 15\%$$

-continued $$I_S \approx \frac{I_2}{2} \cdot 3\%$$

$$T_S \approx 5 \text{ milliseconds}$$

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A device for monitoring operation of a solenoid valve, the device comprising:
    a circuit for supplying power to a coil of the solenoid valve, comprising terminals connected in series with a power source, the terminals configured to be connected to the coil, a power supply switching transistor and a measurement resistor;
    a microprocessor-based measurement system configured to monitor supply current consumed by the coil while the coil is switched on, by measuring voltage at the measurement resistor, and to control the power supply switching transistor;
    wherein the microprocessor-based measurement system:
        comprises an analogue-to-digital converter comprising a consumed current measurement channel connected to the measurement resistor and a consumed current amplified measurement channel connected to the consumed current measurement channel via an adjustable amplifier;
        and is configured to:
        switch off the power supply switching transistor when a voltage having a value higher than a threshold value is detected on the consumed current measurement channel; and
        control the gain of the adjustable amplifier so that the signal at the input of the consumed current amplified measurement channel is lower than the measurement range of this channel.

2. The device of claim 1, wherein the analogue-to-digital converter further comprises a supply voltage measurement channel connected to a resistive voltage divider connected between the supply voltage and the ground, and the microprocessor-based measurement system is configured to monitor the range of the supply voltage and the voltage fluctuation when the power supply is being switched on.

3. The device of claim 1, wherein the consumed current measurement channel is connected to the measurement resistor via a low-pass filter.

4. The device of claim 1, wherein the microprocessor-based measurement system further comprises an input/output interface configured to receive a parameter determining the gain value of the adjustable amplifier.

5. The device of claim 1, wherein the microprocessor-based measurement system is further configured to control the gain of the adjustable amplifier so that the signal at the input of the consumed current amplified measurement channel is higher than a threshold minimum value.

6. The device of claim 1, wherein the microprocessor-based measurement system is further configured to control the gain of the adjustable amplifier so that the signal at the input of the consumed current amplified measurement channel is lower than a threshold maximum value.

7. The device of claim 6, wherein the microprocessor-based measurement system is further configured to control the gain of the adjustable amplifier so that the signal at the input of the consumed current amplified measurement channel after stabilization of the coil current is close to the threshold maximum value.

8. The device of claim 1, having components arranged on a printed circuit board (PCB) enclosed by a plug configured to connect a power supply to the solenoid valve.

9. A method for monitoring operation of a solenoid valve, comprising the steps of:
- connecting a device of claim 1 to a coil of the solenoid valve;
- switching on power supply to the power supply switching transistor;
- awaiting for a signal at the input of the consumed current amplified measurement channel to exceed a minimum value threshold;
- examining the slope of the characteristics of the consumed current amplified measurement channel and storing the value of the signal of the consumed current amplified measurement channel when the slope reaches the horizontal, and determining, based on the stored value, the values of the minimum slope, the limit value of the increment, and the stabilization value;
- continuing examination of the slope when the slope falls to a value below the minimum slope, until the direction of the slope changes from descending to ascending and from this point onwards, checking the signal value increment of the consumed current amplified measurement channel and when it exceeds the increment limit value, awaiting for the current value to stabilize such that the difference between the maximum and minimum values during the specified stabilization time is smaller than the stabilization value;
- reporting that the solenoid valve is switched on correctly if the current value stabilizes within the specified final stabilization time and the current stabilization does not occur later than the permissible total switch-on time since exceeding the minimum value threshold; and
- reporting that the solenoid valve failed if the current value does not stabilize before the specified switch-on time since exceeding the minimum value threshold.

* * * * *